US009958621B2

(12) United States Patent
Wong et al.

(10) Patent No.: US 9,958,621 B2
(45) Date of Patent: *May 1, 2018

(54) LATCHING CONNECTOR WITH REMOTE RELEASE

(71) Applicant: Senko Advanced Components, Inc., Marlborough, MA (US)

(72) Inventors: Yim Wong, Tsuen Wan (HK); Cary E. Ruffner, Irwin, PA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/463,211

(22) Filed: Mar. 20, 2017

(65) Prior Publication Data
US 2017/0192183 A1 Jul. 6, 2017

Related U.S. Application Data

(63) Continuation of application No. 14/521,414, filed on Oct. 22, 2014, now Pat. No. 9,599,778.

(51) Int. Cl.
*G02B 6/38* (2006.01)
*H01R 13/627* (2006.01)
*H01R 13/633* (2006.01)

(52) U.S. Cl.
CPC ......... *G02B 6/3893* (2013.01); *G02B 6/3817* (2013.01); *G02B 6/3825* (2013.01);
(Continued)

(58) Field of Classification Search
CPC .. G02B 6/3825; G02B 6/3898; G02B 6/3893; G02B 6/3817; G02B 6/3879;
(Continued)

(56) References Cited

U.S. PATENT DOCUMENTS

| 8,465,317 B2* | 6/2013 | Gniadek | H01R 13/6335 439/344 |
| 2014/0038447 A1* | 2/2014 | Brown | H01R 13/62 439/350 |

OTHER PUBLICATIONS

International Preliminary Report on Patentability dated May 4, 2017 from related International Application No. PCT/US15/052933, International Filing Date Sep. 29, 2015.

* cited by examiner

*Primary Examiner* — John M Bedtelyon
(74) *Attorney, Agent, or Firm* — Edward S. Jarmolowicz, Esq.

(57) ABSTRACT

Switchable housings and connector assemblies for connections to high density panels are disclosed, as well as components thereof. A connector assembly may include cable assembly connectors configured to engage with a mating connector in a first direction. A latching portion may be configured to engage and selectively disengage the cable assembly connector with the mating connector. A switchable housing may contain release members configured to contact the latching portion and provide a compressing force sufficient to selectively disengage the cable assembly connector from the mating connector and a pull tab assembly in contact with the release members. Movement of the pull tab assembly in a second direction may cause the pull tab assembly to compress the one or more release members, thereby causing the one or more release members to provide the compressing force to disengage the cable assembly connector from the mating connector.

17 Claims, 14 Drawing Sheets

(52) U.S. Cl.
CPC ......... *G02B 6/3879* (2013.01); *G02B 6/3897*
(2013.01); *H01R 13/6272* (2013.01); ***H01R
13/6335*** (2013.01); *G02B 6/3898* (2013.01)

(58) Field of Classification Search
CPC .... G02B 6/3897; H01R 13/62; H01R 13/627;
H01R 13/6271; H01R 13/6272; H01R
13/6273; H01R 13/6275; H01R 13/6276;
H01R 13/6277; H01R 13/6278; H01R
13/633; H01R 13/6335
See application file for complete search history.

LATCHING CONNECTOR WITH REMOTE RELEASE

CROSS-REFERENCE TO RELATED APPLICATIONS

This application is a continuation of U.S. patent application Ser. No. 14/521,414, filed Oct. 22, 2014, now U.S. Pat. No. 9,599,778, which is incorporated herein by reference in its entirety.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels have not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Over-stressing the cables and connectors may produce latent defects, compromise the integrity and/or reliability of the terminations, and potentially cause serious disruptions to network performance.

While an operator may attempt to use a tool, such as a screwdriver, to reach into the dense group of connectors and activate the release mechanism, the adjacent cables and connectors may obstruct the operator's line of sight, making it difficult to guide the tool to the release mechanism without pushing aside the surrounding cables. Moreover, even when the operator has a clear line of sight, guiding the tool to the release mechanism may be a time-consuming process. Thus, using a tool may not be effective at reducing support time and increasing the quality of service.

SUMMARY

In an embodiment, a connector assembly may include one or more cable assembly connectors configured to engage with a mating connector along a coupling axis in a first direction. Each of the one or more cable assembly connectors may include a latching portion that is configured to engage and selectively disengage the cable assembly connector with the mating connector. The connector assembly may further include a switchable housing that contains one or more release members configured to contact the latching portion and provide a compressing force sufficient to selectively disengage the cable assembly connector from the mating connector and a pull tab assembly in contact with the one or more release members and configured to move along the coupling axis. Movement of the pull tab assembly in a second direction along the coupling axis may cause the pull tab assembly to compress the one or more release members, thereby causing the one or more release members to provide the compressing force to disengage the cable assembly connector from the mating connector.

In an embodiment, a switchable housing may include one or more release members configured to contact a latching portion of a connector assembly and provide a compressing force sufficient to provide a disengaging force of a cable assembly connector. The switchable housing may further include a pull tab assembly having a crossbar in contact with the one or more release members. The pull tab assembly may be configured to move along a coupling axis. Movement of the pull tab assembly in a direction along the coupling axis that is away from a cable assembly connector may cause the crossbar to compress the one or more release members, thereby causing the one or more release members to provide the compressing force.

In an embodiment, a high density panel may include a panel having a mounting surface, a first mating connector disposed on the mounting surface and having a first edge, a second mating connector disposed on the mounting surface and having a second edge, a cable assembly connector configured to engage with each mating connector along a coupling axis in a first direction, and a switchable housing. The distance between the first edge and the second edge may be less than about 1.25 millimeters. The cable assembly connector may include a latching portion that is configured to engage and selectively disengage the cable assembly connector with the mating connector. The switchable housing may include one or more release members configured to contact the latching portion of each cable assembly connector and provide a compressing force sufficient to selectively disengage the cable assembly connector from the mating connector. The switchable housing may also include a pull tab assembly in contact with the one or more release members and configured to move along the coupling axis. Movement of the pull tab assembly in a second direction along the coupling axis may cause the pull tab assembly to compress the one or more release members, thereby causing the one or more release members to provide the compressing force to disengage the cable assembly connector from the mating connector.

DETAILED DESCRIPTION

Figure 1:
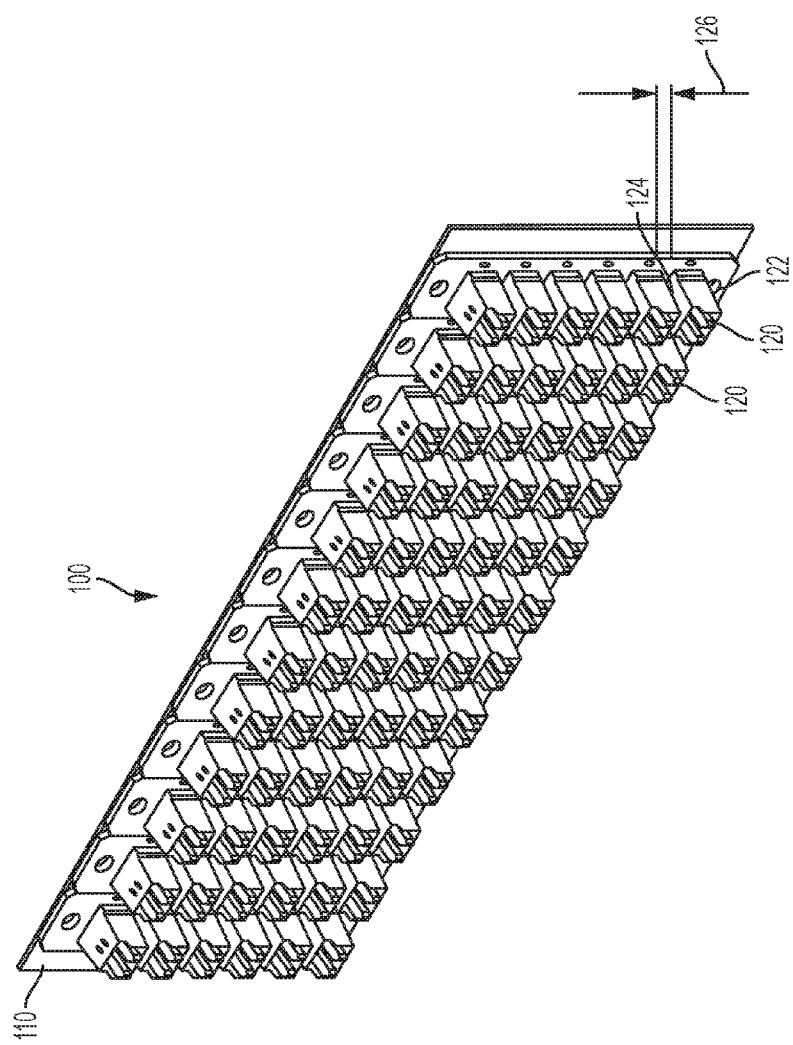
FIG. 1 depicts an illustrative high density panel including a plurality of couplers according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, an SC connector, an SC duplex connector, or a straight tip (ST) connector. The connector may generally be defined by a connector housing body. In some embodiments, the housing body may incorporate any or all of the components described herein.

A back post, as used herein, refers to a device that is used to connect a conduit (such as a fiber optic cable or an electrical conductor) to the connector housing. In some embodiments, the back post may connect with other similarly functioning components, such as a mini boot or the like. The back post can be a separate component from the connector housing body or an integrated component of the connector housing body. The back post can have a plurality of protrusions thereon to provide additional crimping security.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

An "electrical conductor" refers to a wire, a cable, a conduit, or the like that carries an electrical current. The electrical conductor may generally be constructed of any material suitable for conducting electricity. Illustrative examples of electrical conductors include electrical connectors and electrical conveyors, among others. The conductor can include a jacket or sheathing material surrounding the various conductor materials. In addition, the conductor can be connected to a connector on one end or on both ends of the conductor.

The present disclosure relates generally to devices that integrate with existing cable assembly connectors and/or are similarly shaped and sized such that existing equipment can be used to connect signal conduits such as fiber optic cables and electrical conductors to high density panels. The devices described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like.

FIG. 1 depicts a high density panel, generally designated 100, according to an embodiment. In various embodiments, the high density panel 100 may include a mounting surface 110, such as, for example, a printed circuit board. A plurality of couplers 120 may be disposed on the mounting surface 110 and may further be arranged in generally close proximity to one another. In some embodiments, the plurality of couplers 120 may be arranged in a plurality of rows and a plurality of columns. Each coupler 120 may have a first edge 122 and a second edge 124. The density of the panel 100 (i.e., the number of couplers 120 on the panel) may be increased by decreasing a distance 126 between a first edge 122 of a first coupler and a second edge 124 of a second coupler. Conversely, the density of the panel 100 may be decreased by increasing a distance 126 between the first edge 122 of the first coupler 120 and a second edge 124 of a second coupler.

Figure 2A:
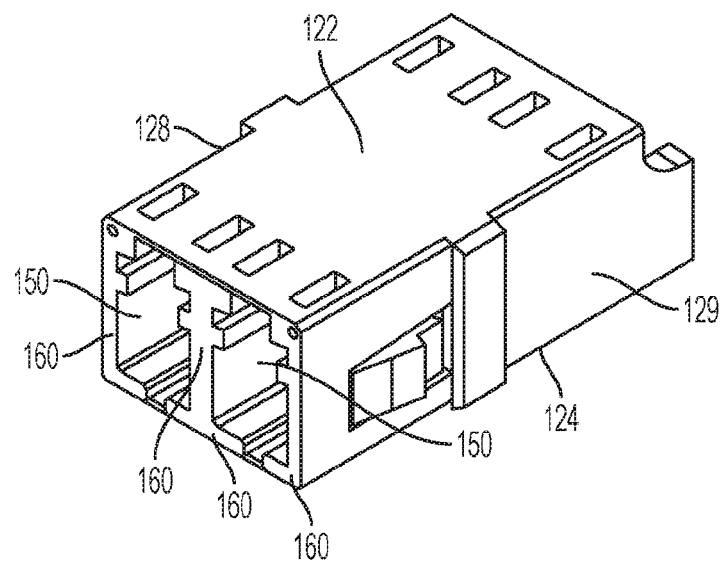
FIG. 2A depicts a perspective view of an illustrative coupler with mating connectors according to an embodiment.
Figure 2B:
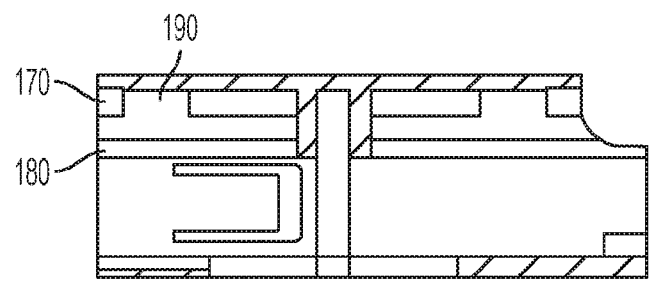
FIG. 2B depicts a side view of the illustrative coupler of FIG. 2A according to an embodiment.

As also shown in FIGS. 2A and 2B, the coupler 120 may generally include mating connectors 150. Each mating connector 150 may include symmetrical sidewalls 160. Each sidewall 160 may be attached to and include a top rail 170, a bottom rail 180, and a trap 190. The top rail 170 and the bottom rail 180 may protrude from an inner surface of the sidewall 160.

In various embodiments, each coupler 120 may have any shape, size, or configuration to accept any connector. In particular embodiments, each coupler 120 may be configured to accept the connectors described herein. In some embodiments, each coupler 120 may be configured to engage with an LC connector. Thus, each coupler 120 or a component thereof (such as the mating connector 150) may be any type and form of shape, design, and/or dimensions. In some embodiments, the coupler 120 or a component thereof, such as the mating connector 150, may include conical, circular, tube-like, square-like, spherical, or rectangular components or shapes. The coupler 120 or a component thereof, such as the mating connector 150, may interface or latch with a latching connector along a length dimension which may be substantially parallel with an optical fiber or electrical conductor running through the coupler/mating connector. The coupler 120 or a component thereof, such as the mating connector 150, may also include a width and a height that is orthogonal to the length, where the width and length are orthogonal to each other.

In various embodiments, the width of the coupler 120 may be about 0.01 millimeters (mm) to about 10 centimeters (cm). For example, the coupler 120 may have a width of about 0.01 mm, about 0.05 mm, about 0.1 mm, about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 12 mm, about 15 mm, about 18 mm, about 25 mm, about 50 mm, about 100 mm, or any value or range between any two of these values (including endpoints). In various embodiments, the height of the coupler 120 may be about 0.01 mm to about 10 cm. For example, the coupler 120 may have a height of about 0.01 mm, about 0.05 mm, about 0.1 mm, about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 12 mm, about 15 mm, about 18 mm, about 25 mm, about 50 mm, about 100 mm, or any value or range between any two of these values (including endpoints).

In various embodiments, the width of the mating connector 150 may be about 0.01 mm to about 10 cm. For example, the mating connector 150 may have a width of about 0.01 mm, about 0.05 mm, about 0.1 mm, about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 12 mm, about 15 mm, about 18 mm, about 25 mm, about 50 mm, about 100 mm, or any value or range between any two of these values (including endpoints). In various embodiments, the height of the mating connector 150 may be about 0.01 mm to about 10 cm. For example, the mating connector 150 may have a height of about 0.01 mm, about 0.05 mm, about 0.1 mm, about 0.5 mm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, about 12 mm, about 15 mm, about 18 mm, about 25 mm, about 50 mm, about 100 mm, or any value or range between any two of these values (including endpoints).

In various embodiments, a high density panel 100 of mating connectors 150 or couplers 120 may include a plurality of mating connectors or couplers arranged into an array of rows and columns. In some embodiments, each row may be substantially parallel to an adjacent row. Similarly, each column may be substantially parallel to an adjacent column. Accordingly, each row may be substantially perpendicular to each column. In other embodiments, a row may be non-parallel to an adjacent row. Similarly, a column may be non-parallel to an adjacent column. Such arrangements may be orderly or disorderly arrangements.

In a particular embodiment, a panel 100 may include a set of 30 mating connectors 150 or couplers 120. The mating connectors 150 or couplers 120 may be arranged in 6 columns and 5 rows. The distance between each of the mating connectors 150 or the couplers 120 in the panel 100 along a width of the panel may be about 0.001 mm to about 30 mm, including about 0.001 mm, about 0.005 mm, about 0.01 mm, about 0.03 mm, about 0.05 mm, about 0.08 mm, about 0.1 mm, about 0.25 mm, about 0.5 mm, about 0.75 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, about 5 mm, about 10 mm, about 30 mm, or any value or range between any two of these values (including endpoints). Similarly, the distance between each of the mating connectors 150 or the couplers 120 in the panel 100 along a height of the panel may be about 0.001 mm to about 30 mm, including about 0.001 mm, about 0.005 mm, about 0.01 mm, about 0.03 mm, about 0.05 mm, about 0.08 mm, about 0.1 mm, about 0.25 mm, about 0.5 mm, about 0.75 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, about 5 mm, about 10 mm, about 30 mm, or any value or range between any two of these values (including endpoints).

In another embodiment, a panel may include a set of 30 mating connectors 150 or couplers 120. The mating connectors 150 or couplers 120 may be arranged in a non-parallel or non-perpendicular manner. The distance between each mating connector 150 or coupler 120 along the width of the panel may be about 0.001 mm to about 30 mm, including about 0.001 mm, about 0.005 mm, about 0.01 mm, about 0.03 mm, about 0.05 mm, about 0.08 mm, about 0.1 mm, about 0.25 mm, about 0.5 mm, about 0.75 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, about 5 mm, about 10 mm, about 30 mm, or any value or range between any two of these values (including endpoints). Similarly, the distance between each of the mating connectors 150 or the couplers 120 in the panel 100 along a height of the panel may be about 0.001 mm to about 30 mm, including about 0.001 mm, about 0.005 mm, about 0.01 mm, about 0.03 mm, about 0.05 mm, about 0.08 mm, about 0.1 mm, about 0.25 mm, about 0.5 mm, about 0.75 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.5 mm, about 5 mm, about 10 mm, about 30 mm, or any value or range between any two of these values (including endpoints).

Those having ordinary skill in the art will recognize that the embodiments described herein are merely examples and that other embodiments are intended to be within the scope of the present disclosure. Furthermore, the dimensions of the mating connectors 150 or the couplers 120, as well as the distances in a panel 100, on each side of the mating connector or connector, may vary dependent on the design.

Figure 3A:
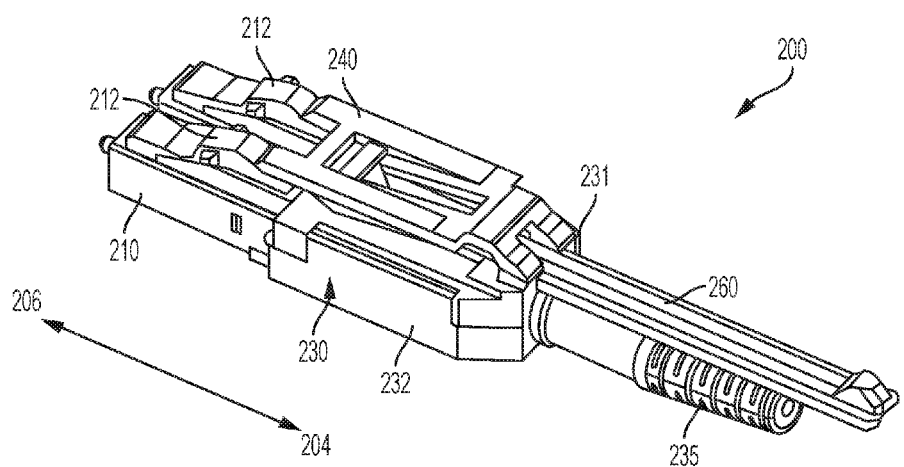
FIG. 3A depicts a side perspective view of an illustrative remote release connector according to an embodiment.
Figure 3B:
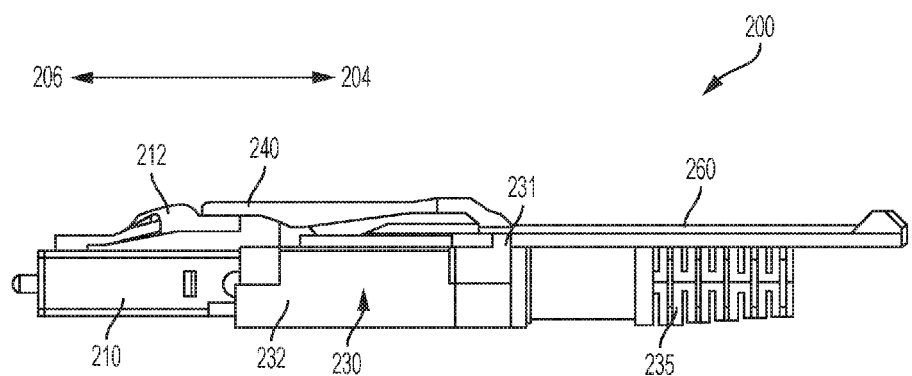
FIG. 3B depicts a side view of an illustrative remote release connector according to an embodiment.

FIGS. 3A and 3B depict a side perspective view and a side view, respectively, of an illustrative remote latch release connector assembly, generally designated 200, according to an embodiment. In various embodiments, the remote latch release connector assembly 200 may be configured to connect to the mating connector 150 (FIG. 2A).

The remote latch release connector assembly 200 may generally include one or more cable assembly connectors 210 connected to a switchable housing 230 having one or more release members 240 and one or more pull tab assemblies 260. In some embodiments, the remote latch release connector assembly 200 may be a multi-port connector assembly having a plurality of cable assembly connectors 210 connected to a switchable housing 230 having a plurality of release members 240 and a plurality of pull tab assemblies 260. While FIGS. 3A and 3B depict two cable assembly connectors 210, a single release member 240, and a single pull tab assembly 260, those having ordinary skill in the art will recognize various other combinations without departing from the scope of the present disclosure. As will be described in greater detail herein, each cable assembly connector 210 may be configured to attach to a mating connector 150 (FIG. 2A), where the release member 240 and the pull tab assembly 260 may be configured to release the remote latch release connector assembly 200 from the mating connector.

In various embodiments, a cable assembly connector 210 may be a portion of the remote latch release connector assembly 200 that directly connects with the mating connector 150 (FIG. 2A). For example, a portion of the cable assembly connector 210 may be inserted into the mating connector 150 (FIG. 2A). As shown in FIGS. 4 and 5A-5C, the cable assembly connector 210 may include, for example, a connector housing 211 and a latching portion 212. In some embodiments, the cable assembly connector 210 may include a bore 213 therethrough, thereby forming a first opening 214 at a first end 215 and a second opening 216 at a second end 217. As described in greater detail herein, the bore 213 may allow the cable assembly connector 210 to provide an optical path from an optical connector (via the switchable housing 230) to the mating connector 150 (FIG. 2A). In some embodiments, the bore 213 may allow the cable assembly connector 210 to provide an electrical path from an electrical connector (via the switchable housing 230) to the mating connector 150 (FIG. 2A).

The cable assembly connector 210 is not limited by this disclosure, and may generally be any cable assembly connector. In some embodiments, the cable assembly connector 210 may be a preexisting component for which the remainder of the remote latch release connector assembly 200 is constructed around. In other embodiments, the cable assembly connector 210 may be formed as a portion of the remote latch release connector assembly 200. Illustrative cable assembly connectors may include, but are not limited to, a ferrule connector (FC), a fiber distributed data interface (FDDI) connector, an LC connector, a mechanical transfer (MT) connector, an SC connector, an SC duplex connector, or a straight tip (ST) connector.

Various portions of the cable assembly connector 210 may generally be constructed of a polymeric material, particularly polymeric materials that are suited for withstanding various external forces and/or environmental conditions. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, and nitrocellulose.

In various embodiments, the latching portion 212 may have a first end that is attached to the connector housing 211 and a second end that is not attached to the connector housing. Referring also to FIGS. 2A and 2B, the mating connector 150 may receive the cable assembly connector 210 portions of the remote latch release connector assembly 200. An operator may engage the cable assembly connector 210 with the mating connector 150 by guiding a leading edge of the cable assembly connector into the mating connector and applying a force in the coupling direction 206. The operator-applied force in turn may cause a top inner surface of the mating connector 150 to compress the latching portion 212, and thereby align the leading edge of the latching portion between the respective top rail 170 and bottom rail 180. When a trailing edge of each latching portion 212 crosses an interface between the respective top rail 170 and bottom rail 180, the latching portion becomes sandwiched between the respective top rail and bottom rail, thereby maintaining the latching portion in a compressed position. When the trailing edge of each latching portion 212 crosses into the respective trap 190, the latching portion 212 becomes decompressed, thereby trapping the latching portion in the trap. In this trapped position, the cable assembly connector 210 is said to be engaged with the mating connector 150.

The cable assembly connector 210 may be disengaged from the mating connector 150 by compressing the latching portion 212 and simultaneously applying a force that is opposite to the coupling direction 206. As will be described in greater detail herein, compressing the latching portion 212 may be completed by causing one or more release members to compress the latching portion. Compression may be completed such that the latching portion 212 is aligned with an interface between the respective top rail 170 and the bottom rail 180. The leading edge of each latching portion 212 crosses the interface between the respective top rail 170 and the bottom rail 180, freeing the latching portion 212 from the trap 190. The force guides the cable assembly connector 210 out of the mating connector 150.

In some embodiments, the first opening 214 may be generally surrounded by a back post 218 such that the second opening can be accessed via a tip portion of the back post. The back post 218 may be constructed as a continuous portion of the connector housing 211 or may be constructed as a portion separate from the connector housing. When the back post 218 is separate, it may be affixed to the connector housing 211. The back post 218 may generally be constructed of a polymeric material, particularly polymeric materials that are suited for withstanding various external forces and/or environmental conditions such as a crimping pressure or the like. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, and nitrocellulose.

In various embodiments, the second opening 216 may be configured to receive a terminating cable, particularly a terminating cable from the panel 100 (FIG. 1). In some embodiments, the second opening 216 may be configured to securely receive a terminating cable. Accordingly, the second opening 216 may be any shape or size to accommodate any terminating cable. In addition, the second opening 216 may be configured to accept any type of coupling from the terminating cable, including, for example, screws, clips, snaps, push-pull type couplings, duplex snaps, bayonet couplings, and the like, or any combination thereof. The second opening 216 may further be configured to receive one or more optical fibers from the terminating cable, and in conjunction with the other various components as described herein, may provide an optical connection with an optical cable.

In various embodiments, the second opening 216 may be configured to retentively engage the terminating cable along a coupling direction 206. Retentive engagement may include releasable engagement, permanent retentive engagement, and semi-permanent retentive engagement. Thus, the second opening 216 may include various components that assist in retentively engaging the terminating cable. Illustrative components used to retentively engage the terminating cable may include a screw, a clip, a snap, a push-pull type device, a bayonet, a flange, a retention arm, a ferrule 219, a spring 222, and/or the like. Illustrative components used to permanently and/or semi-permanently retain the terminating cable may include glues, adhesives, and/or the like.

The second opening 216 may be configured to receive and hold a ferrule 219 in a generally longitudinal alignment with the bore 213. The ferrule 219 may have a central passageway 220 extending longitudinally fully through the ferrule. The ferrule 219 may be configured to receive a terminating cable such that the portions of the terminating cable are inserted into the central passageway 220. The portions may be affixed within the ferrule central passageway 220 with the portions terminating at or near a forward tip 221 of the ferrule 219. In some embodiments, the ferrule 219 may be made of a material similar to the other components of the cable assembly connector 210. In other embodiments, the ferrule 219 may be made of ceramic, metal, a polymeric material, or any other suitable material.

In various embodiments, a spring 222 may be positioned within the connector housing 211 such that it is in or around the bore 213 near the ferrule 219. In some embodiments, the spring 222 may be configured to bias the ferrule 219 in a forward direction relative to the second opening 216. Thus, the spring 222 may provide a forward biasing force on the ferrule 219 to allow the ferrule to move in a forward direction. Accordingly, this positioning may permit the tip of the ferrule 219 to engage and be rearwardly displaced during insertion of a terminating optical cable.

As previously described herein, the bore 213 may generally be a passageway or the like through the connector housing 211 that extends from the first opening 215 to the second opening 217. The bore 213 is not limited by this disclosure, and may be any size and/or shape, particularly sizes and/or shapes that allow for passage of optical fibers or electrical conductors through at least a portion of the connector housing 211, as described in greater detail herein. In some embodiments, the bore 213 may be lined or coated with a material so as to facilitate movement of light or electrical signals through the bore. In some embodiments, the bore 213 may contain a ferrule flange tube 225, which acts as a guide for portions of a cable through the bore, as described in greater detail herein. The ferrule flange tube 225 may be constructed of or coated with various materials to facilitate movement of light or electrical signals through the bore 213. In some embodiments, a flange 226 may slip on the ferrule flange tube 225 such that the ferrule flange tube can provide a guided passageway from the back post 218 to a flange inlet for a portion of a cable to pass through and enter the ferrule 219 via the bore 213. In some embodiments, the ferrule flange tube 225 may be made of a polymeric material, such as, for example, polytetrafluoroethylene.

As shown in FIG. 4 and FIGS. 6A-6E, the switchable housing 230 portion of the remote latch release connector assembly 200 may include a switchable housing top 231 and a switchable housing bottom 232. In various embodiments, the switchable housing top 231 may be joined with the switchable housing bottom 232 to form the switchable housing 230. The switchable housing top 231 and the switchable housing bottom 232 may be joined by any method, including, but not limited to, use of one or more adhesives, connection via one or more interlocking mechanisms, and/or the like. In some embodiments, the top 231 and bottom 232 may be fabricated as a single piece, thereby obviating a need for joining. The top 231 and bottom 232 are merely illustrative portions of the switchable housing 230. Thus, in some embodiments, the switchable housing 230 may be a single unit. In some embodiments, the switchable housing 230 may have a left side portion and a right side portion.

In some embodiments, the switchable housing 230 may be configured to retentively engage various other portions described herein. In some embodiments, the switchable housing 230 may be configured to act as a conduit for transmission of signals. In some embodiments, the switchable housing 230 may be configured to protect various components from damage during operation.

Various portions of the switchable housing 230 may generally be constructed of a polymeric material, particularly polymeric materials that are suited for withstanding various external forces and/or environmental conditions. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, and nitrocellulose.

In various embodiments, the switchable housing 230 may be of any size or shape, particularly shapes and/or sizes suitable for receiving one or more back posts 218 of one or more cable assembly connectors 210 and/or supporting one or more mini boots 235, as described in greater detail herein. In some embodiments, the switchable housing may have a length $L_1$ of about 1 mm to about 20 cm, including, for example, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, about 20 cm, or any value or range between any two of these values (including endpoints). In some embodiments, the switchable housing 230 may have a width $W_1$ of about 1 mm to about 10 cm, including, for example, about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, about 10 cm, or any value or range between any two of these values (including endpoints).

In various embodiments, the switchable housing 230 may generally be configured to receive the back post 218 portion of one or more cable assembly connectors 210 and retentively engage with the back post portion of the one or more assembly connectors along a coupling direction 204. For example, the switchable housing 230 may be configured such that a first end 239 of the switchable housing contacts the second end 217 of the cable assembly connector 210 in a manner that causes at least a portion of the back post 218 to be received in a recess 238 of the switchable housing 230 along the coupling direction 204. Thus, to connect the switchable housing 230 to a cable assembly connector 210, the back post 218 may be inserted in the recess 238 at the first end 239 of the switchable housing such that the second end 217 of the cable assembly connector contacts or moves in close proximity to the first end of the switchable housing along the coupling direction 204. Furthermore, the recess 238 may be particularly shaped and/or sized to receive the back post 218. For example, the recess 238 may have a shape and/or size that is substantially the same size or larger than the back post 218 such that the back post can be inserted in the recess. In some embodiments, the recess 238 may be configured to receivably retain the back post 218 therein when the back post is inserted therein such that the back post is prevented from moving substantially within the recess.

In various embodiments, the switchable housing 230 may include one or more recesses 238 therein for receiving back posts 218. In particular embodiments, the switchable housing 230 may include a plurality of recesses 238 therein for receiving a plurality of back posts 218. For example, as shown in FIGS. 6A-6E, the switchable housing 230 may include two recesses 238 therein. However, the number and configuration of recesses 238 shown in FIGS. 6A-6E is merely illustrative, and those having ordinary skill in the art may recognize other numbers and configurations of recesses without departing from the scope of this disclosure. For example, a switchable housing 230 may have 1, 2, 3, 4, 5, 6, 7, 8, 9, 10, 11, 12, 13, 14, 15, 16, 17, 18, 19, 20, or more recesses 238. Furthermore, the recesses 238 may be arranged in any configuration within the switchable housing 230, particularly at the first end 239 of the switchable housing. For example, the recesses may be arranged in a line configuration, a grid configuration, or any other configuration that may correspond to the arrangement of mating connectors (FIG. 2A) described herein such that a plurality of cable assembly connectors 210 connected to a switchable housing 230 can be inserted into respective mating connectors.

In various embodiments, a second end 237 of the switchable housing 230 may be configured to receive a switchable housing back post 236 therein. In some embodiments, the switchable housing back post 236 may be integrated with the second end 237 of the switchable housing. In other embodiments, the second end 237 may be configured to retentively engage the switchable housing back post therein 236 along the coupling direction 204. In some embodiments, the second end 237 may contain an opening that is generally surrounded by the switchable housing back post 236 such that the opening can be accessed via a tip portion of the switchable housing back post. The switchable housing back post 236 may be constructed as a continuous portion of the switchable housing 230 or may be constructed as a portion separate from the switchable housing. When the switchable housing back post 236 is a separate element, it may be affixed to the switchable housing 230. The switchable housing back post 236 may be arranged in a general longitudinal alignment with the switchable housing 230. The switchable housing back post 236 may generally be constructed of a polymeric material, particularly polymeric materials that are suited for withstanding various external forces and/or environmental conditions such as a crimping pressure or the like. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly(vinyl butyrate), polyvinylidene difluoride (PVDF), silicones, polyformaldehyde, cellulose, cellulose acetate, and nitrocellulose.

Figure 4:
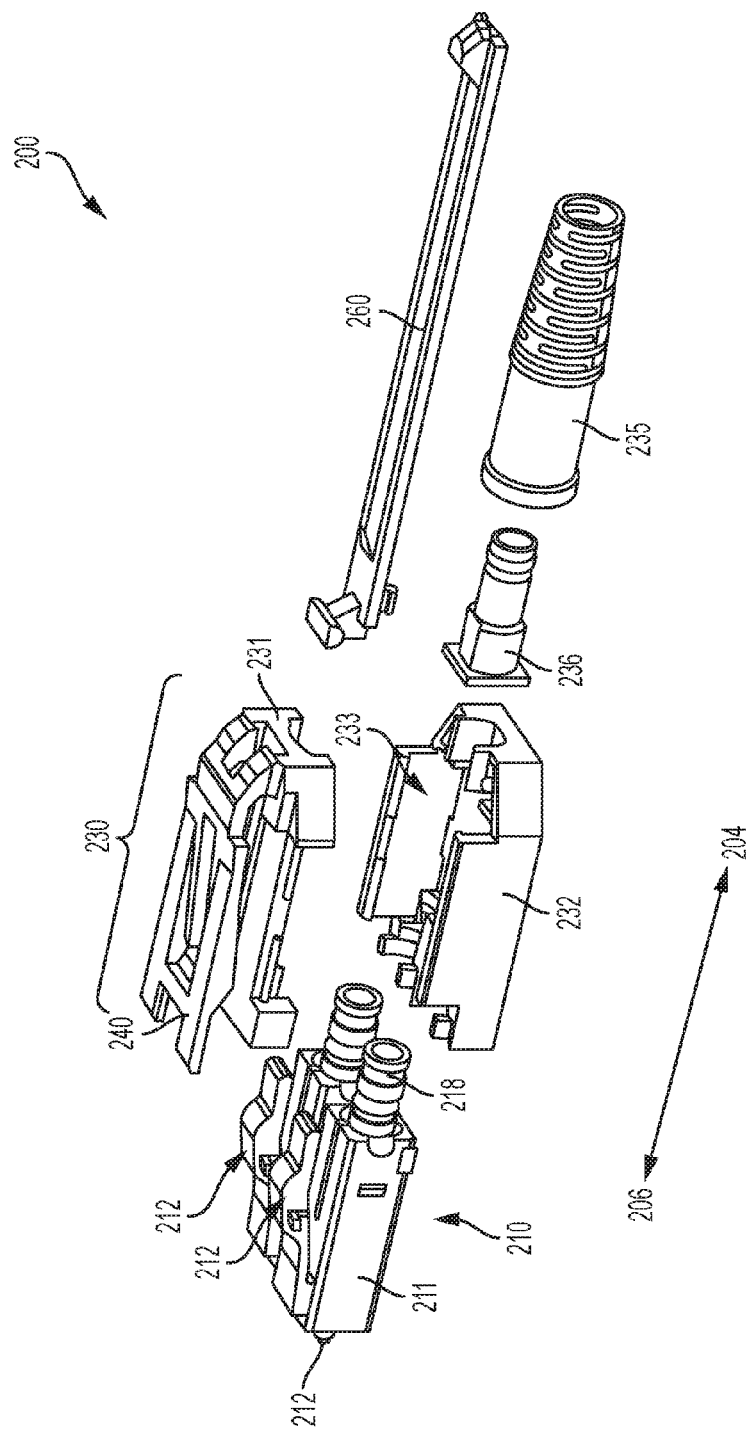
FIG. 4 depicts a perspective view of a disassembled illustrative remote release connector according to an embodiment.
Figure 5A:
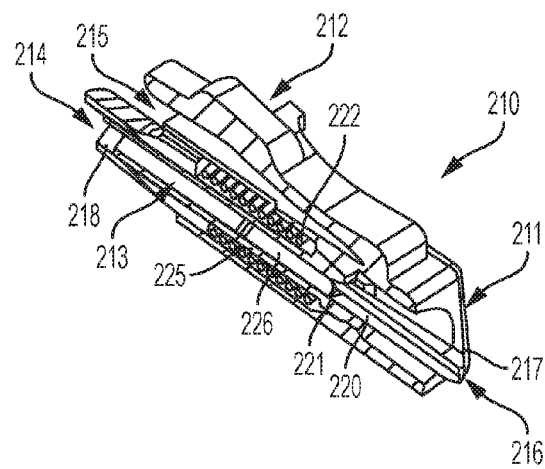
FIG. 5A depicts a side perspective cutaway view of an illustrative cable assembly connector according to an embodiment.
Figure 5B:
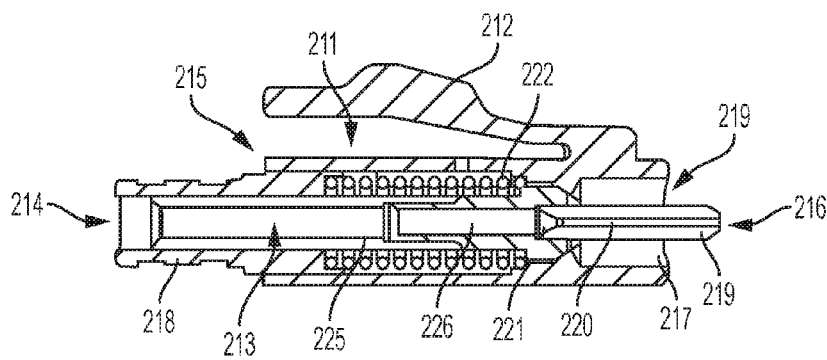
FIG. 5B depicts a side cutaway view of an illustrative cable assembly connector according to an embodiment.
Figure 5C:
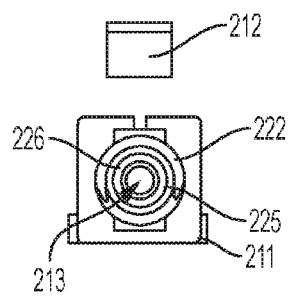
FIG. 5C depicts an end cutaway view of an illustrative cable assembly connector according to an embodiment.

In various embodiments, the switchable housing back post 236 may be configured to retentively engage with a mini boot 235, such as the mini boot depicted in FIG. 4. In some embodiments, the switchable housing back post 236 may be configured such that at least a portion of the mini boot 235 surrounds at least a portion of the back post, thereby removably retaining the mini boot on the back post along a coupling direction 204. In some embodiments, the mini boot 235 may provide a connection between a signal transmission conduit (not shown) and the switchable housing back post 236. In some embodiments, the signal transmission conduit may be an optical fiber for transmission of optical signals therethrough. In other embodiments, the signal transmission conduit may be an electrical conductor for transmission of electrical signals therethrough.

In various embodiments, an interior portion 233 of the switchable housing 230 may be configured to provide a passageway between the one or more recesses 238 (and thus the back posts 218 inserted therein) and the switchable housing back post 236, thereby acting as a conduit for transmission of signals over a distance spanning the length $L_1$ of the switchable housing 230. In some embodiments, the passageway may be an optical passageway such that optical signals transmitted via the one or more back posts 218 are propagated through the switchable housing back post 236. Thus, the passageway may extend from the first end 239 of the switchable housing 230 to the second end 237 of the switchable housing. The passageway is not limited by this disclosure, and may be any size and/or shape, particularly sizes and/or shapes that allow for passage of optical fibers through at least a portion of the switchable housing 237, as described in greater detail herein. In some embodiments, at least a portion of the passageway may be lined or coated with a material so as to facilitate movement of light through the passageway. In some embodiments, the passageway may be configured such that, when the switchable housing 230 contains a plurality of recesses 238, the passageway can switch transmission of light between each recess and the switchable housing back post 236 so that only one recess is in optical communication with the back post at any one time. In other embodiments, the passageway may be configured such that, when the switchable housing 230 contains a plurality of recesses 238, the passageway can combine optical transmissions from the plurality of recesses for transmission through the switchable housing back post 236 and/or split an optical transmission from the switchable housing back post such that each of the plurality of recesses 238 receives the optical transmission.

In various embodiments, the one or more release members 240 may be connected to at least a portion of the switchable housing 230 and configured to release one or more cable assembly connectors 210 from a high density panel 100 (FIG. 1), as described in greater detail herein. In some embodiments, the one or more release members 240 may be connected to the switchable housing top 231 portion of the switchable housing 230. As previously described herein, those having ordinary skill in the art will recognize any number of release members 240 may be used, such as, for example, 1, 2, 3, 4, 5, 6, 7, 8, 9, 10, or more release members. In some embodiments, the switchable housing 230 may incorporate one release member 240 for each of the cable assembly connectors 210 to which a release member engages, as described in greater detail herein. In other embodiments, the switchable housing 230 may incorporate a release member 240 for a plurality of cable assembly connectors 210 to which the release member engages. For example, as shown in FIG. 4, a single release member 240 may be incorporated with the switchable housing 230 and configure to engage with two cable assembly connectors 210. For purposes of simplicity, a single release member 240 will be described herein.

As shown in FIGS. 6A-6D, the release member 240 may be constructed such that it extends substantially along the length L₁ of the switchable housing 230. In various embodiments, the release member 240 may be constructed such that, when lateral movement of a pull tab assembly contacts various segments of the release member, it causes at least a portion of the release member to move toward or away from the switchable housing 230, as described in greater detail herein. Thus, in some embodiments, the release member 240 may include a first segment 241 at a first end and a second segment 242 at a second end. In some embodiments, the release member 240 may also include a third segment 243 and a fourth segment 244 between the first segment 241 and the second segment 242. The various segments 241, 242, 243, 244 of the release member 240 may generally be constructed such that they can engage at least a portion of a pull tab assembly. For example, various portions of the segments 241, 242, 243, 244 of the release member 240 may contain an opening, such as a slot extending the length of the release member such that a portion of a pull tab assembly can be inserted into the slot to manipulate the release member, as described in greater detail herein.

In some embodiments, the first segment 241 of the release member 240 may be affixed to a portion of the switchable housing 230. For example, in some embodiments, the first segment 241 may be formed as a portion extending from the switchable housing 230. In other embodiments, the first segment 241 may be formed such that it is detachably affixed to the switchable housing 230. In various embodiments, the second segment 242, the third segment 243, and the fourth segment 244 of the release member 240 may be unattached to the switchable housing. Thus, the second segment 242, the third segment 243, and the fourth segment 244 may be freely movable with respect to the switchable housing 230. Particularly, the various segments may be compressible towards the switchable housing 230. Accordingly, the attachment of the first segment 241 to the switchable housing 230 may act as a hinge or the like that allows movement of the second segment 242, the third segment 243, and the fourth segment 244 relative to the switchable housing. In some embodiments, a force F may be applied to the release member 240 such that at least a portion of the release member (such as the second segment 242, the third segment 243, and/or the fourth segment 244) moves downward from an original resting position toward the switchable housing 230. Similarly, when the force F is removed, the release member 240 may move upwards away from the switchable housing 230 back to the original resting position.

Figure 6A:
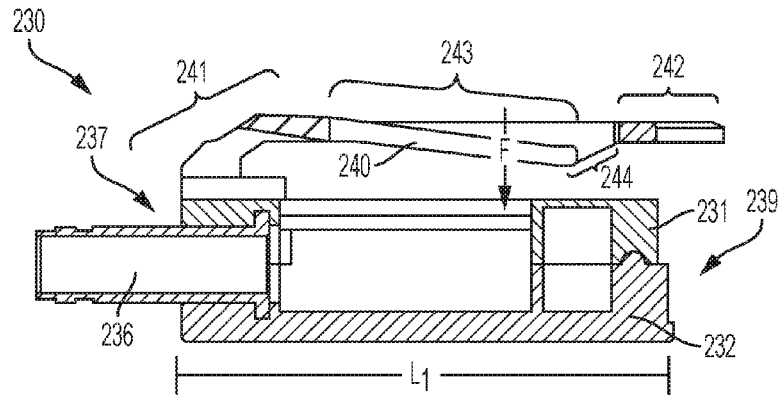
FIG. 6A depicts a side view of an illustrative switchable housing according to an embodiment.
Figure 6B:
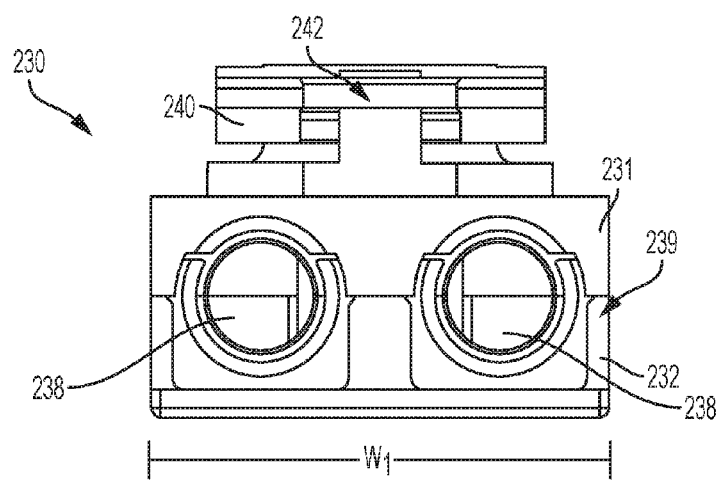
FIG. 6B depicts a first end view of an illustrative switchable housing according to an embodiment.
Figure 7A:
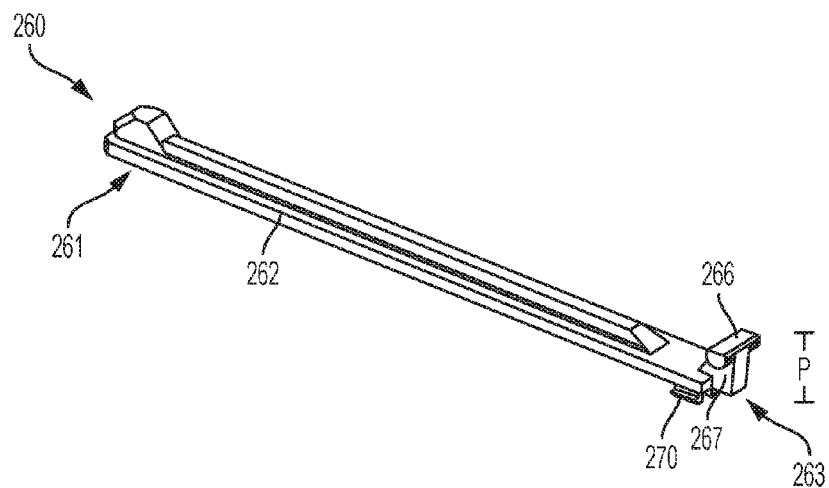
FIG. 7A depicts a side perspective view of an illustrative pull tab assembly according to an embodiment.

In various embodiments, the release member 240 may generally be shaped such that a portion of the release member (for example, the second segment 242) may engage with the latching portion 212 of the cable assembly connector 210 (FIGS. 4 and 5A-5C) to cause the latching portion to unlatch, as described in greater detail herein. Thus, in some embodiments, the first segment 241 of the release member 240 may extend from a proximal point where it contacts the switchable housing 230 to a distal point in a direction that is substantially away from the switchable housing, as shown in FIG. 6A. The third segment 243 of the release member 240 may extend from a proximal point where it contacts the distal point of the first segment 241 to a distal point in a direction that is substantially parallel to slightly towards the switchable housing 230. The fourth segment 244 of the release member 240 may extend from a proximal point where it contacts the distal point of the third segment 243 to a distal point in a direction that is substantially away from the switchable housing 230. The second segment 242 of the release member 240 may extend from a proximal point where it contacts the distal point of the fourth segment 244 to a distal point in a direction that is substantially parallel to slightly towards the switchable housing 230 or substantially parallel to the latching portion 212 (FIGS. 4 and 5A-5C). Such a release member 240 shape is merely illustrative. Accordingly, those having ordinary skill in the art may recognize other shapes of the release member 240 that would sufficiently engage the latching portion 212 (FIGS. 4 and 5A-5C) without departing from the scope of the present disclosure. In some embodiments, the shape of the release member 240 may be such that lateral movement of a pull tab assembly 260 (FIGS. 7A-7C) past various portions of the release member may cause the force F to be applied and/or released depending on the location of the pull tab assembly, as described in greater detail herein.

Similar to other components described herein, the release member 240 may generally be constructed of a polymeric material, particularly polymeric materials that are suited for withstanding various external forces and/or environmental conditions such as the force F or the like. Other suitable polymeric materials may include those that can be formable via the various methods described herein. Illustrative polymeric materials may include various polymeric resins such as polystyrene, polystyrene/latex, and other organic and inorganic polymers, both natural and synthetic. Other illustrative polymeric materials may include polyethylene, polypropylene, poly(4-methylbutene), polystyrene, polymethacrylate, poly(ethylene terephthalate), rayon, nylon, poly (vinyl butyrate), polyvinylidene difluoride (PVDF), silicones, polyformaldehyde, cellulose, cellulose acetate, and nitrocellulose.

Figure 6C:
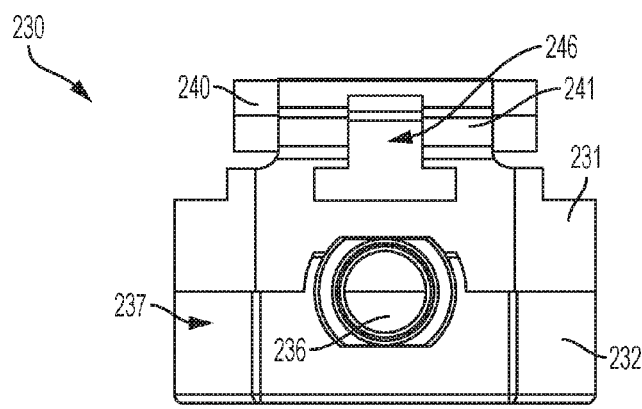
FIG. 6C depicts a second end view of an illustrative switchable housing according to an embodiment.
Figure 6D:
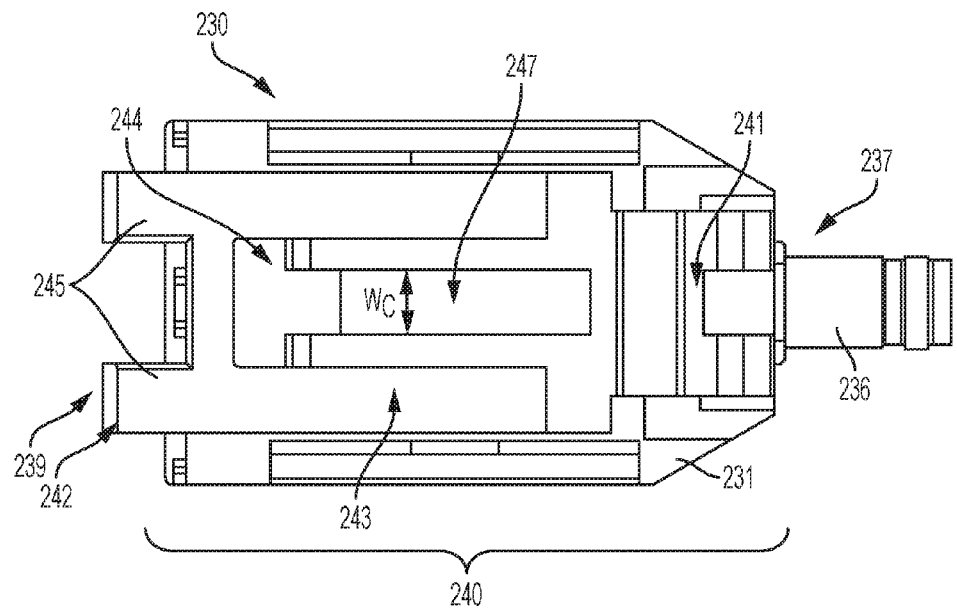
FIG. 6D depicts a top view of an illustrative switchable housing according to an embodiment.
Figure 6E:
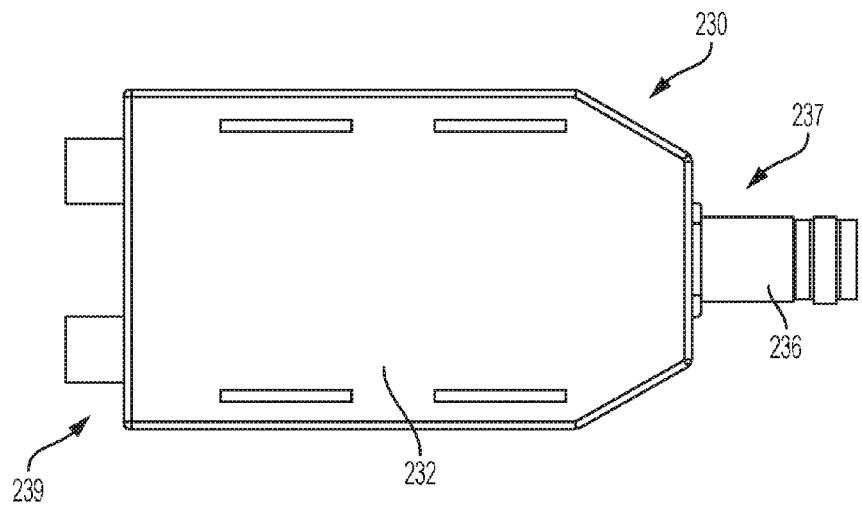
FIG. 6E depicts a bottom view of an illustrative switchable housing according to an embodiment.

In various embodiments, particularly as shown in FIG. 6D, the second segment 242 of the release member 240 may include one or more prongs, tabs, or the like 245 that are configured to engage with the latching portion 212 of the cable assembly connector 210 (FIGS. 4 and 5A-5C). Thus, the number of prongs, tabs, or the like may correspond to the number of cable assembly connectors 210 to which the release member 240 engages. For example, if a single release member 240 is configured to engage with two cable assembly connectors 210, the second segment 242 may contain two prongs, tabs, or the like 245 where each prong, tab, or the like corresponds to the latching portion 212 of one of the cable assembly connectors 210. Furthermore, in some embodiments, each prong, tab, or the like 245 may be shaped and/or sized to generally correspond to the shape and/or size of the latching portion 212 to which it engages, thereby ensuring effective engagement of the latching portion with the second segment 242 of the release member 240.

In various embodiments, particularly as shown in FIG. 6D, portions of the release member 240 may include a channel 247 extending through the release member and along a length of the release member. For example, in some embodiments, the channel 247 may extend substantially along the third segment 243 and/or the fourth segment 244 of the release member. The channel 247 may be configured such that at least a portion of a pull tab protrudes through the channel and can be slidably moved along a length of the channel, as described in greater detail herein. Accordingly, a width $W_C$ of the channel 247 may generally correspond to a width of a pull tab protrusion such that the protrusion can extend from the pull tab through the channel. In some embodiments, the width $W_C$ of the channel 247 may be substantially the same size as a width of a pull tab and/or a pull tab protrusion. In other embodiments, the width $W_C$ of the channel 247 may be slightly larger than the width of the pull tab and/or the pull tab protrusion, thereby ensuring the pull tab can be slidably movable without hindrance from the channel, as described in greater detail herein. Illustrative widths may include, but are not limited to, about 1 mm to about 5 cm, including about 1 mm, about 2 mm, about 3 mm, about 5 mm, about 6 mm, about 7 mm, about 8 mm, about 9 mm, about 1 cm, about 2 cm, about 3 cm, about 4 cm, about 5 cm, or any value or range between any two of these values (including endpoints).

In various embodiments, particularly as shown in FIG. 6C, the first segment 241 of the release member 240 may include an opening 246 therethrough. Such an opening 246 may generally provide a space for which a portion of a pull tab may extend, as described in greater detail herein. The opening 246 may generally have a shape and/or size that corresponds to a cross-sectional shape and/or size of a pull tab extending therethrough. In some embodiments, the opening 246 may have a general shape that is substantially similar to a cross-sectional shape of the pull tab and may further be slightly larger than the cross sectional size of the pull tab such that the pull tab can be moved through the opening without hindrance, as described in greater detail herein. In some embodiments, the opening 246 may have a width that corresponds to a width of the channel 247.

FIGS. 7A-7D depict various views of the pull tab assembly 260. The pull tab assembly 260 may generally include a first end 261, a central shaft 262, and a second end 263. The pull tab assembly 260 may generally actuate the release member 240 when the pull tab assembly is moved in a longitudinal direction along the coupling axis, as described in greater detail herein. Thus, at least a portion of the pull tab assembly 260 may contact at least a portion of the release member 240. In some embodiments, the pull tab assembly 260 may be longitudinally movable along the coupling axis relative to the various other portions of the remote latch release connector assembly 200.

In various embodiments, the pull tab assembly 260 may generally extend from the switchable housing 230 in a direction away from the cable assembly connector(s) 210. In some embodiments, the pull tab assembly 260 may extend a length $L_2$ that allows for a user to grip the first end 261 without being hindered or blocked by various other portions of the remote latch release connector assembly 200. The length $L_2$ is not limited by this disclosure and may generally be any length, particularly lengths that are greater than the length $L_1$ of the switchable housing 230 (FIG. 6A). Illustrative lengths $L_2$ may include, but are not limited to, about 1 cm, about 2 cm, about 3 cm, about 4 cm, about 5 cm, about 6 cm, about 7 cm, about 8 cm, about 9 cm, about 10 cm, about 15 cm, about 20 cm, about 25 cm, about 50 cm, or any value or range between any two of these values. In some embodiments, the length $L_2$ may be less than about 30 cm. In some embodiments, the length $L_2$ may be greater than 5 cm.

In various embodiments, the first end 261 may protrude in any direction from the pull tab assembly 260 and may generally provide an area for a user to grip the pull tab assembly and exert a force on the pull tab assembly, as described in greater detail herein. For example, in some embodiments, a user may push the pull tab assembly 260 towards the panel 100 (FIG. 1) when installing the remote latch release connector assembly 200 into a coupler 120. In some embodiments, a user may pull the pull tab assembly 260 away from the panel when removing the remote latch release connector assembly 200 from a coupler 120. In some embodiments, the first end 261 of the pull tab assembly 260 may be shaped and sized such that it provides one or more suitable gripping surfaces. In some embodiments, the first end 261 of the pull tab assembly 260 may be contoured to provide the one or more suitable gripping surfaces. Such shapes and sizes are not limited by this disclosure, and may generally be any shape and/or size, particularly shapes and/or sizes generally recognized as being suitable for gripping surfaces. In some embodiments, the first end 261 may be coated or covered with a non-slip material to prevent slippage when a user grips the first end and moves the pull tab assembly 260.

The central shaft 262 of the pull tab assembly 260 may generally connect the first end 261 to the second end 263. In some embodiments, a majority of the length $L_2$ of the pull tab assembly 260 may be the central shaft 262. Thus, the central shaft 262 may have a length of about 0.5 cm, about 1 cm, about 2 cm, about 3 cm, about 4 cm, about 5 cm, about 6 cm, about 7 cm, about 8 cm, about 9 cm, about 10 cm, about 15 cm, about 20 cm, about 25 cm, about 50 cm, or any value or range between any two of these values. As shown in FIG. 7D, in various embodiments, the central shaft 262 may have a cross sectional shape and size that generally corresponds to the opening 246 located in the first segment 241 of the release member 240 (FIG. 6C). Thus, the central shaft 262 may be inserted into the opening 246 (FIG. 6C)

such that the pull tab assembly 260 is movable relative to the various portions of the remote latch connector 200 along a coupling axis. Furthermore, the opening 246 may prevent the pull tab assembly from moving in directions other than along the coupling axis because of the corresponding shapes of the opening and the cross section of the central shaft 262. In addition, the corresponding shapes of the opening 246 and the cross section of the central shaft 262 may be smaller and/or have a different shape than the first end 261 and/or the second end 263 of the pull tab assembly 260 thereby limiting and/or preventing the pull tab assembly from disconnecting from the remote latch release connector assembly 200.

Figure 7B:
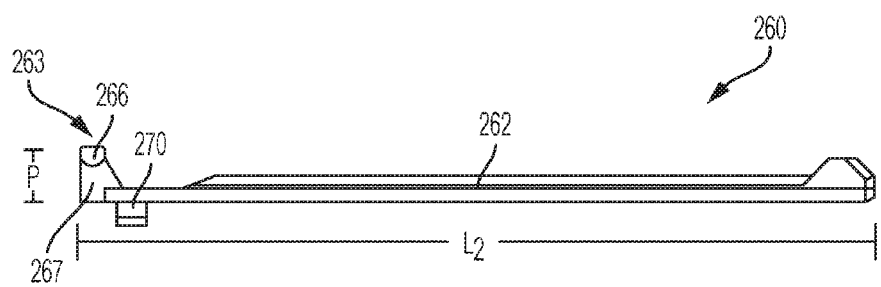
FIG. 7B depicts a side view of an illustrative pull tab assembly according to an embodiment.
Figure 7C:
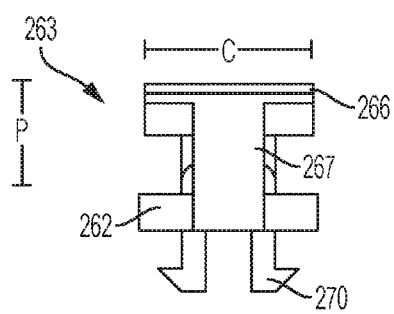
FIG. 7C depicts a front view of an illustrative pull tab assembly according to an embodiment.
Figure 7D:
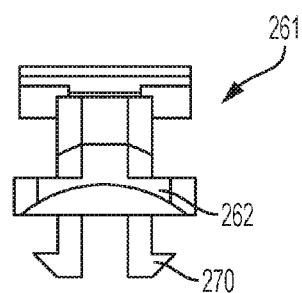
FIG. 7D depicts a cross-sectional view of an illustrative central shaft portion of a pull tab assembly according to an embodiment.
Figure 8A:
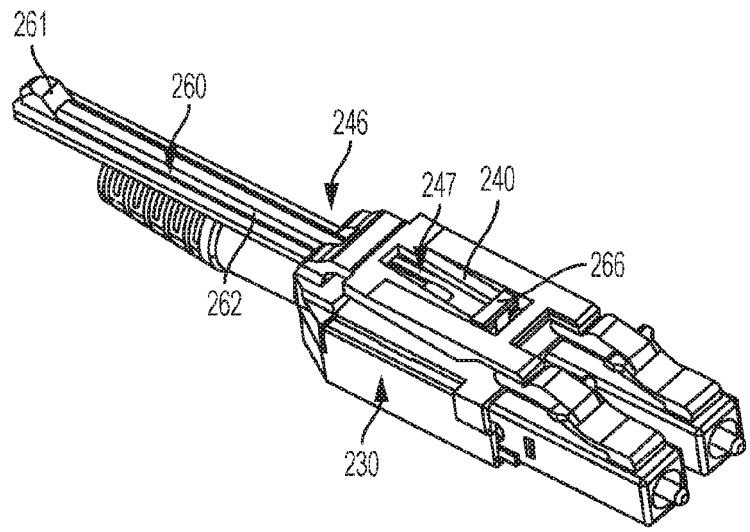
FIG. 8A depicts a perspective right side view of an illustrative switchable housing assembly integrated with a pull tab assembly according to an embodiment.
Figure 8B:
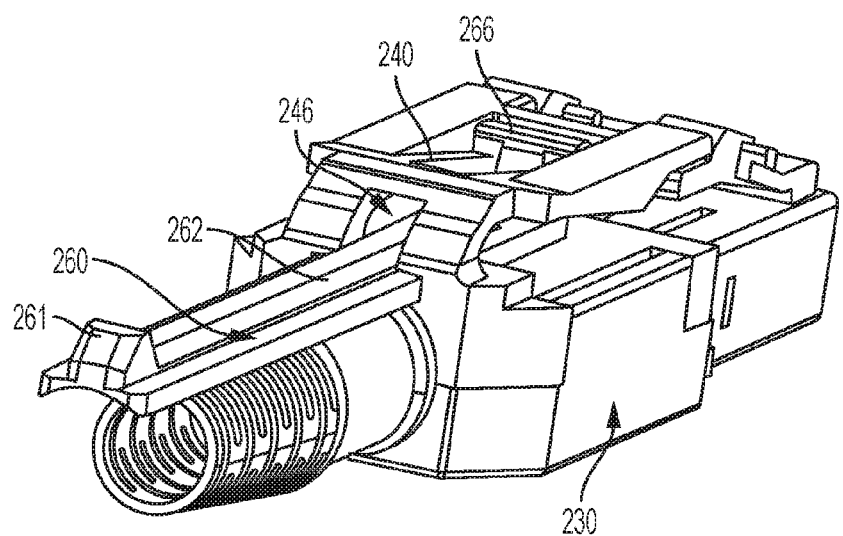
FIG. 8B depicts a perspective left side view of an illustrative switchable housing assembly integrated with a pull tab assembly according to an embodiment.
Figure 8C:
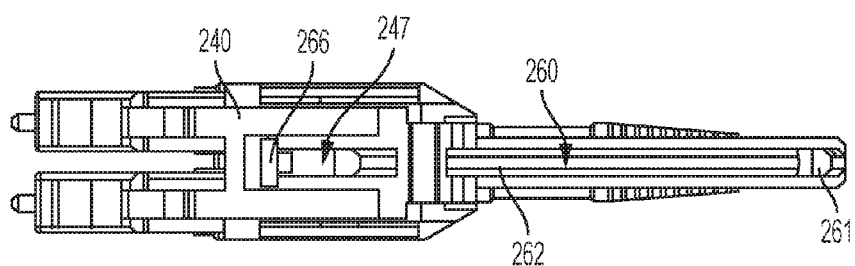
FIG. 8C depicts a top view of an illustrative switchable housing assembly integrated with a pull tab assembly according to an embodiment.
Figure 8D:
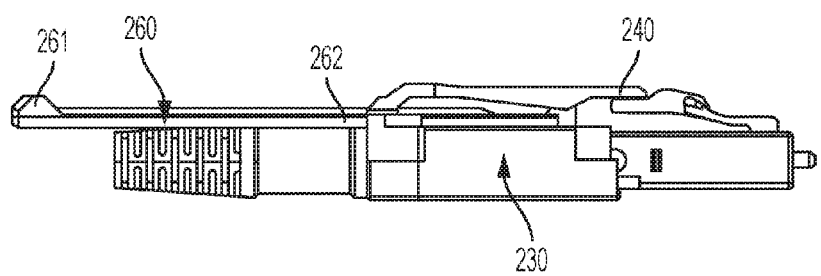
FIG. 8D depicts a side view of an illustrative switchable housing assembly integrated with a pull tab assembly according to an embodiment.

In some embodiments, such as shown in FIGS. 7B and 7C, the central shaft 262 may include one or more guides 270 that assist in guiding movement of the pull tab assembly 260 as described herein. Each guide 270 may be symmetrically disposed on the central shaft 262, protruding downwardly from a bottom surface of the central shaft for a length that is approximately equal to a height of a guide track that may be present in the switchable housing top 231 (FIG. 4). In addition, each guide 270 may curve inwardly towards the center of the central shaft 262.

In various embodiments, the second end 263 of the pull tab assembly 260 may include a protrusion 267 that protrudes from the central shaft 262. In some embodiments, the protrusion 267 may protrude in a generally perpendicular direction a distance P from the central shaft 262. The distance P is not limited by this disclosure and may generally be any distance that allows the protrusion 267 to extend through the channel 247 (FIG. 6D) of the release member 240. For example, in some embodiments, the distance P may be about 1 mm to about 10 cm, including about 1 mm, about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, about 10 cm, or any value or range between any two of these values (including endpoints).

The protrusion 267 may include a crossbar 266 that extends perpendicularly from the protrusion such that a cross-sectional shape of the protrusion is T shaped, as shown in FIG. 7C. However, such a shape is merely illustrative; those having ordinary skill in the art will recognize other shapes, particularly shapes that allow the protrusion 267 to extend through the channel 247 (FIG. 6D) such that the crossbar 266 extends a distance C that is greater than the width $W_C$ of the channel, thereby ensuring that the protrusion remains protruding through the channel without slipping out. Thus, illustrative distances may include, but are not limited to, about 2 mm to about 10 cm, including about 2 mm, about 3 mm, about 4 mm, about 5 mm, about 6 mm, about 7 mm, about 8 mm, about 9 mm, about 1 cm, about 2 cm, about 3 cm, about 4 cm, about 5 cm, about 6 cm, about 7 cm, about 8 cm, about 9 cm, about 10 cm, or any value or range between any two of these values (including endpoints).

Placement of the protrusion 267 such that the crossbar 266 is located on top of the release member 240 when the protrusion protrudes through the channel 247 (FIG. 6D) may generally allow the second end 263 of the pull tab assembly 260 to move longitudinally along the length of the release member, hindered only by the length of the channel. In addition, the crossbar 266 may provide a vertical force on a portion of the release member 240 to cause vertical movement of the release member relative to the switchable housing 230, as described in greater detail herein.

Figure 9:
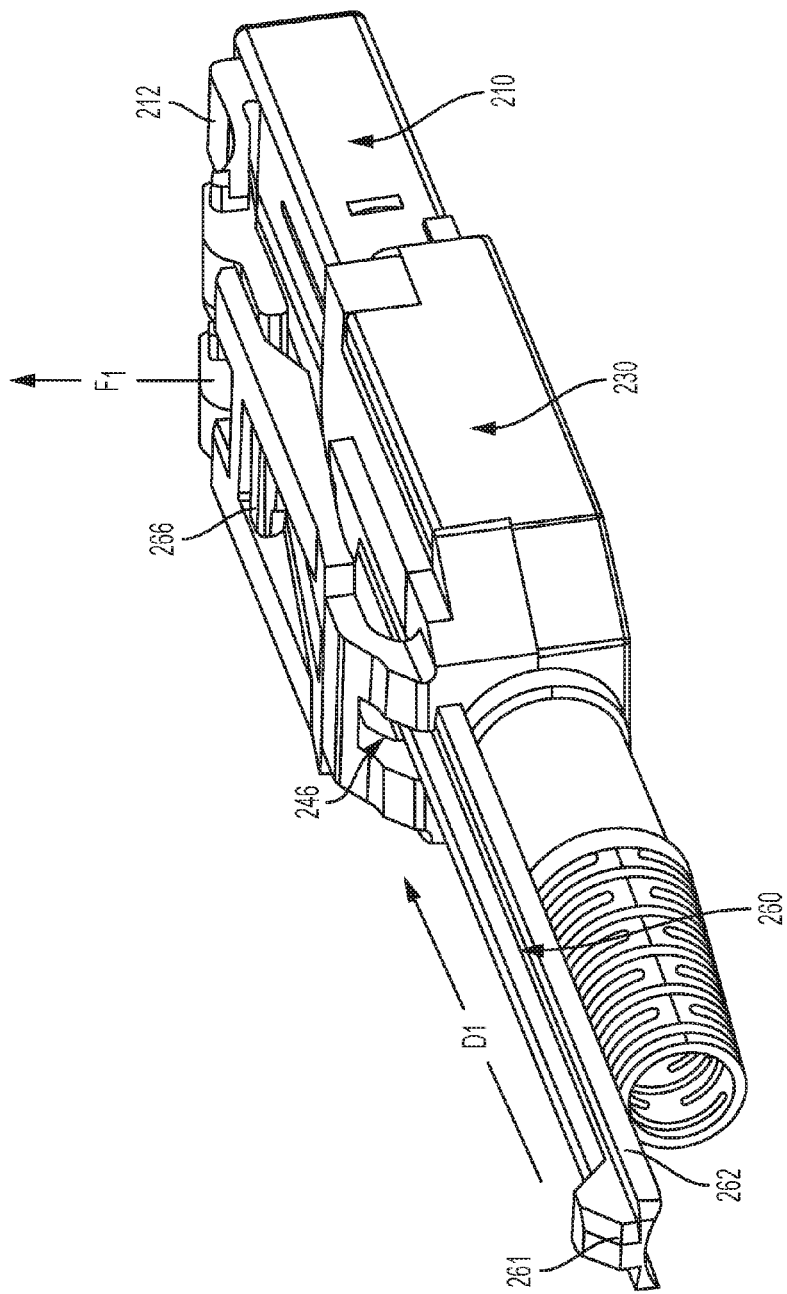
FIG. 9 depicts a perspective side view of a locking movement of the pull tab assembly according to an embodiment.
Figure 10:
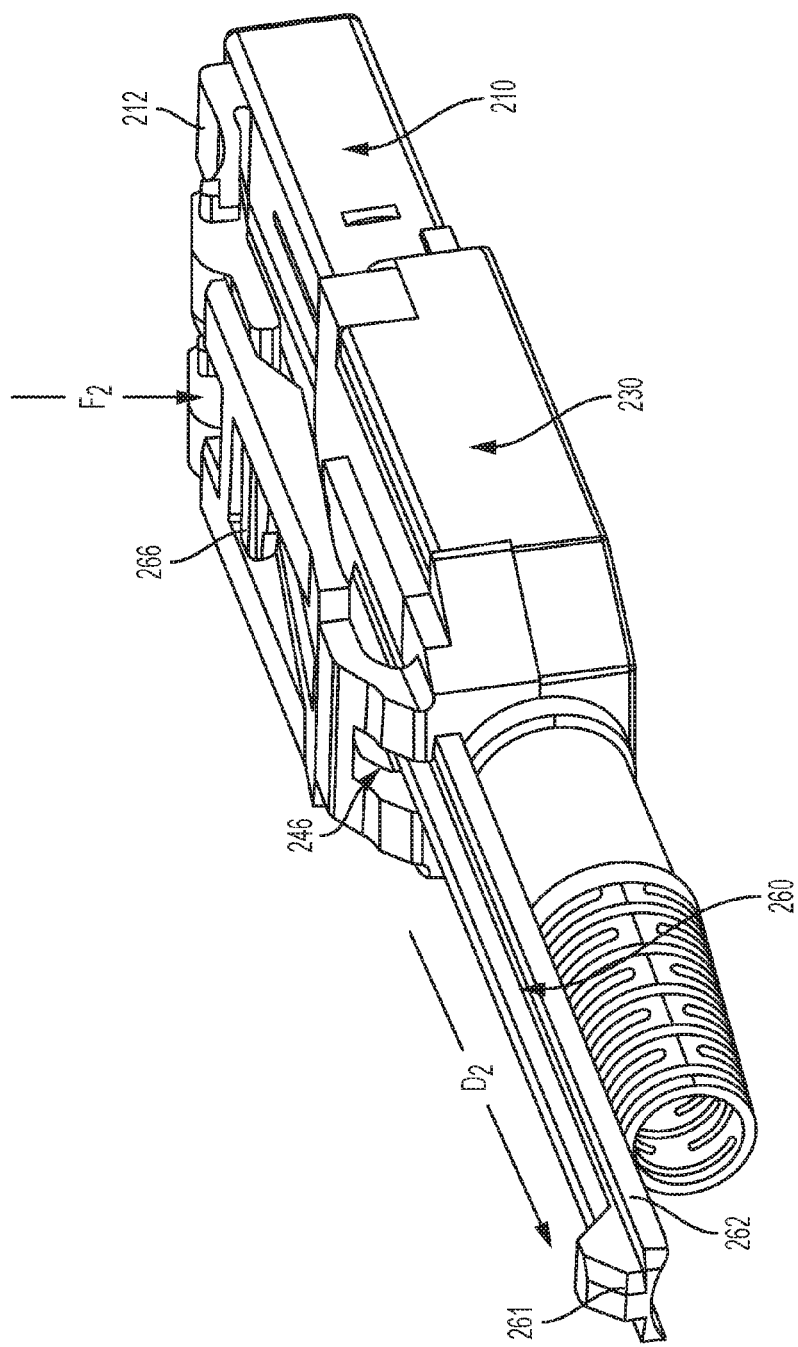
FIG. 10 depicts a perspective side view of a releasing movement of the pull tab assembly according to an embodiment.

FIGS. 9 and 10 depict the illustrative longitudinal movement of the pull tab assembly 260 relative to the various other portions of the remote latch release connector assembly 200 according to an embodiment. Particularly, FIG. 9 depicts a resting state and/or a state where the remote latch release assembly is inserted into a board according to an embodiment. In such a resting state, the pull tab assembly 260 may be pushed forward in a first direction $D_1$ (i.e., towards the board/cable assembly connectors) such that the crossbar 266 does not cause a vertical force on the release member 240 and/or allows the release member to be in a resting position. Such a position may ensure that the second segment 242 of the release member 240 is not exacting a force on the latching portion 212 of the cable assembly connector 210 or is exacting a force that is minimal or insignificant enough to press down on the latching portion to effect release of the cable assembly connector from the board. Thus, in some embodiments, the forward location of the pull tab assembly 260 may ensure that the crossbar 266 rests over the third segment 243 or the fourth segment 244 (or similar portion) of the release member 240, particularly at a location that is closest towards the switchable housing 230, thereby ensuring little or no contact between the crossbar and the release member. In some embodiments, the position of the pull tab assembly 260 may allow for a biasing upward vertical force $F_1$ on the release member 240 such that the second segment 242 (or similar portion) of the release member is lifted off of the latching portion 212 of the cable assembly connector 210.

FIG. 10 depicts an actuated state according to an embodiment. In the actuated state, the pull tab assembly 260 may be moved in a second direction $D_2$ that is generally away from the board. Such a movement of the pull tab assembly may cause the crossbar 266 to move over a higher area of the third segment 243 of the release member 240 (i.e., an area of the release member that is furthest away from the switchable housing 230). Due to the distance the protrusion 267 extends through the channel 247, the crossbar 266 may cause a downward force $F_2$ to be exacted over the release member 240, (i.e., a force that biases the release member towards the switchable housing 230). The downward force $F_2$ may cause the second segment 242 of the release member 240 to contact and/or press down on the latching portion 212, thereby unlatching the cable assembly connector 210 from the board.

Figure 11:
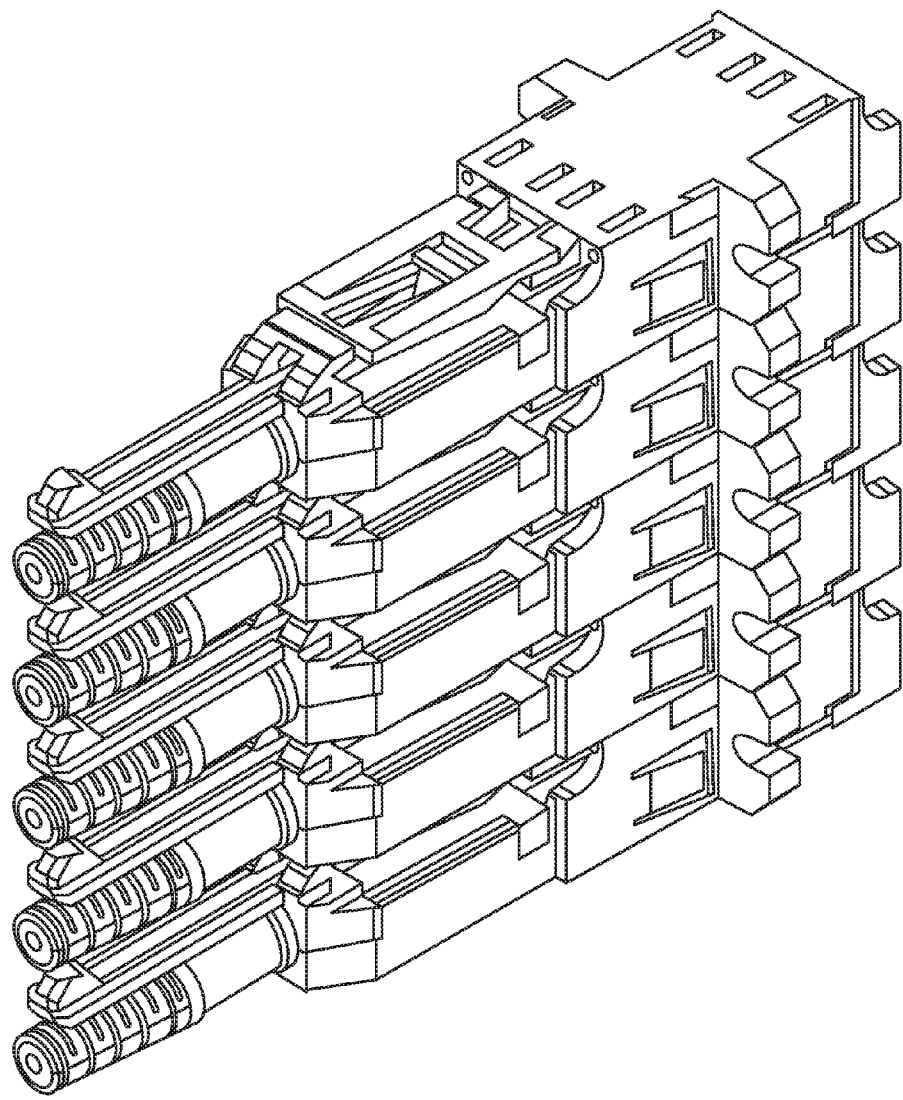
FIG. 11 depicts a side perspective view of an illustrative stack of remote release connectors inserted in a high density panel according to an embodiment.

Such a release mechanism as described herein may generally allow more cable assembly connectors to be inserted into mating connectors on a board because the cable assembly connectors (and the mating connectors) can be installed closely together but still have the functionality to provide a user with an ability to remove individual connectors without hindrance, damaging adjacent connectors, knocking adjacent connectors out of the mating connectors, and/or the like. Accordingly, as shown in FIG. 11, the remote latch release connector assemblies may be stacked or placed in close proximity to each other, particularly at proximities previously described herein with respect to FIG. 1. Moreover, a user may remove each remote latch release connector assembly with relative ease in a closely arranged configuration because the release members remain accessible to the user despite the closeness of the connectors to each other.

Figure 12:
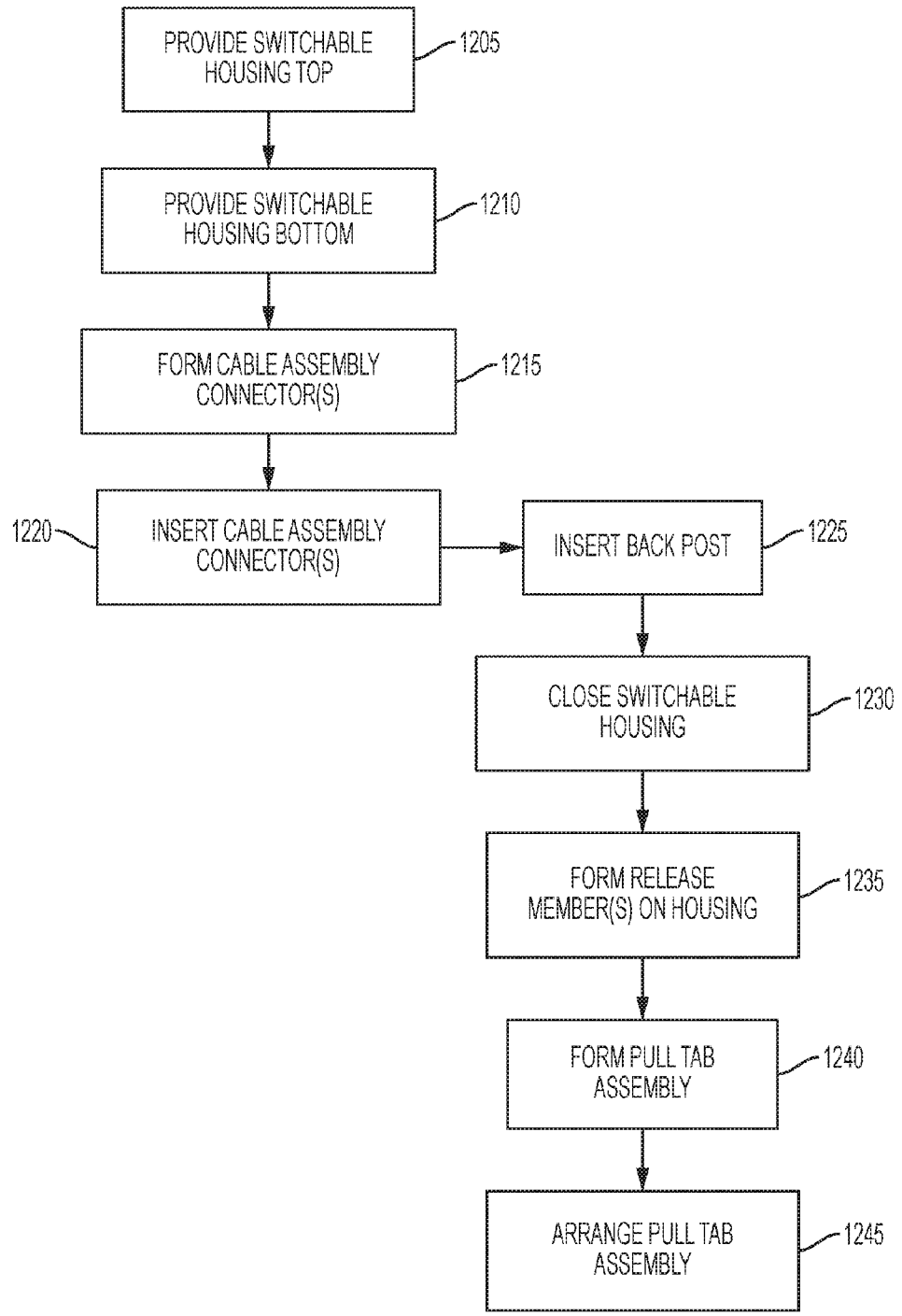
FIG. 12 depicts a flow diagram of an illustrative method of forming a remote latch release connector assembly according to an embodiment.

FIG. 12 depicts a flow diagram of a method of forming the remote latch release connector according to an embodiment. In various embodiments, the switchable housing may be provided, such as by providing 1205 the switchable housing top portion and providing 1210 the switchable housing bottom portion. In some embodiments, the switchable housing may be provided as a single piece, unitary construction. The various portions of the switchable housing may be provided 1205, 1210 by forming the housing via injection molding, by forming the housing via 3D printing, or the like, as described in greater detail herein. In some embodiments, the switchable housing may be provided 1205, 1210 by providing a solid piece construction and forming various openings, spaces inside the housing, bores, and/or the like, as described in greater detail herein.

In some embodiments, the cable assembly connector(s) may be formed 1215. In other embodiments, the cable assembly connector(s) may be obtained from a provider, such as, for example, a manufacturer of cable assembly connectors. The cable assembly connectors may be inserted 1220 in, or otherwise connected to, the switchable housing, as described in greater detail herein. In some embodiments, the cable assembly connectors may be permanently affixed to the housing by any means of fixture, such as, for example, heat fixation, welding, applying an adhesive, applying one or more attachment devices and/or the like. Similarly, the back post may be inserted 1225 in, or otherwise connected to, the switchable housing, as described in greater detail herein. In some embodiments, the cable assembly connectors may be permanently affixed to the housing by any means of fixture, such as, for example, heat fixation, welding, applying an adhesive, applying one or more attachment devices and/or the like. Various other internal parts may be formed or placed in the switchable housing (if necessary), and the switchable housing may be closed 1230 in embodiments where the switchable housing includes a top portion and a bottom portion.

The release member(s) may be formed 1235 on the switchable housing if the release member(s) are a separate part from the switchable housing. Otherwise, such a process may be omitted if the release member is formed 1205, 1210 as part of providing the switchable housing, as described in greater detail herein. In some embodiments, forming 1235 the release member(s) on the switchable housing may include permanently affixing the release member(s) to the housing by any means of fixture, such as, for example, heat fixation, welding, applying an adhesive, applying one or more attachment devices and/or the like In various embodiments, the pull tab assembly may be formed 1240. Similar to the various other components described herein, the pull tab assembly may be formed 1240 via injection molding, by forming the housing via 3D printing, or the like. The pull tab assembly may be arranged 1245 on the housing, such as by placing the crossbar portion of the pull tab assembly above the release member(s) and threading the protrusion of the pull tab assembly through the channel and the central shaft portion of the pull tab assembly though the opening on the release member(s), as described in greater detail herein.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector assembly comprising:
   one or more cable assembly connectors configured to engage with a mating connector along a coupling axis in a first direction, wherein each of the one or more cable assembly connectors comprises a latching portion that is configured to engage and selectively disengage the cable assembly connector with the mating connector; and
   a switchable housing comprising:
      one or more release members configured to contact the latching portion and provide a compressing force sufficient to selectively disengage the cable assembly connector from the mating connector, and
      a pull tab assembly in contact with the one or more release members and configured to move along the coupling axis, wherein movement of the pull tab assembly in a second direction along the coupling axis causes the pull tab assembly to compress the one or more release members, thereby causing the one or more release members to provide the compressing force to disengage the cable assembly connector from the mating connector.

2. The connector assembly of claim 1, wherein the pull tab assembly comprises a protrusion configured to protrude perpendicularly through a channel in the one or more release members and a crossbar that is configured to extend perpendicularly from the protrusion and compress the one or more release members upon movement of the pull tab assembly in the second direction along the coupling axis.

3. The connector assembly of claim 1, wherein each of the one or more release members comprises a plurality of segments, wherein each of the plurality of segments extends in a direction such that a location of the pull tab assembly over the one or more release members determines an amount of compression applied by the pull tab assembly.

4. The connector assembly of claim 1, wherein the connector assembly is a multi-port connector assembly comprising a plurality of cable assembly connectors.

5. The connector assembly of claim 1, wherein the one or more cable assembly connectors and the switchable housing provide an optical path from an optical fiber to the mating connector.

6. The connector assembly of claim 1, wherein the switchable housing further comprises a switchable housing back post configured to connect to a mini boot comprising a signal transmission conduit for transmission of signals to the mating connector.

7. The connector assembly of claim 6, wherein the signal transmission conduit comprises an optical fiber.

8. The connector assembly of claim 6, wherein the signal transmission conduit comprises an electrical conductor.

9. The connector assembly of claim 1, wherein each of the one or more cable assembly connectors is an LC connector.

10. A switchable housing comprising:
    one or more release members configured to contact a latching portion of a connector assembly and provide a compressing force sufficient to provide a disengaging force of a cable assembly connector; and
    a pull tab assembly comprising a crossbar in contact with the one or more release members, wherein the pull tab assembly is configured to move along a coupling axis, wherein movement of the pull tab assembly in a direction along the coupling axis that is away from a cable assembly connector causes the crossbar to compress the one or more release members, thereby causing the one or more release members to provide the compressing force.

11. The switchable housing of claim 10, wherein each of the one or more release members comprises a plurality of segments, wherein each of the plurality of segments extends in a direction such that a location of the pull tab assembly over the one or more release members determines an amount of compression applied by the pull tab assembly.

12. The switchable housing of claim 10, wherein the switchable housing provides an optical path from an optical fiber to the cable assembly connector.

13. The switchable housing of claim 10, further comprising a switchable housing back post configured to connect to a mini boot comprising a signal transmission conduit for transmission of signals to the mating connector.

14. The switchable housing of claim 13, wherein the signal transmission conduit comprises an optical fiber.

15. The switchable housing of claim 13, wherein the signal transmission conduit comprises an electrical conductor.

16. The switchable housing of claim 10, wherein each of the one or more cable assembly connectors is an LC connector.

17. A high density panel comprising:
- a panel having a mounting surface;
- a first mating connector disposed on the mounting surface and having a first edge;
- a second mating connector disposed on the mounting surface and having a second edge, wherein the distance between the first edge and the second edge is less than about 1.25 millimeters,
- a cable assembly connector configured to engage with each mating connector along a coupling axis in a first direction, wherein the cable assembly connector comprises a latching portion that is configured to engage and selectively disengage the cable assembly connector with the mating connector; and
- a switchable housing comprising:
  - one or more release members configured to contact the latching portion of each cable assembly connector and provide a compressing force sufficient to selectively disengage the cable assembly connector from the mating connector, and
  - a pull tab assembly in contact with the one or more release members and configured to move along the coupling axis, wherein movement of the pull tab assembly in a second direction along the coupling axis causes the pull tab assembly to compress the one or more release members, thereby causing the one or more release members to provide the compressing force to disengage the cable assembly connector from the mating connector.

* * * * *